(12) United States Patent
Sakata et al.

(10) Patent No.: US 9,400,664 B2
(45) Date of Patent: Jul. 26, 2016

(54) METHOD AND APPARATUS FOR OFFLOADING STORAGE WORKLOAD

(71) Applicants: Masayuki Sakata, Kirkland, WA (US);
Akio Nakajima, Santa Clara, CA (US);
Akira Deguchi, Santa Clara, CA (US)

(72) Inventors: Masayuki Sakata, Kirkland, WA (US);
Akio Nakajima, Santa Clara, CA (US);
Akira Deguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 668 days.

(21) Appl. No.: 13/721,384

(22) Filed: Dec. 20, 2012

(65) Prior Publication Data

US 2014/0181804 A1    Jun. 26, 2014

(51) Int. Cl.
*G06F 9/455*  (2006.01)
*G06F 9/50*   (2006.01)
*H04L 29/08*  (2006.01)
*G06F 3/06*   (2006.01)

(52) U.S. Cl.
CPC .......... *G06F 9/455* (2013.01); *G06F 9/45558* (2013.01); *G06F 9/5088* (2013.01); *H04L 67/1097* (2013.01); *G06F 3/067* (2013.01); *G06F 3/0662* (2013.01); *G06F 2009/45579* (2013.01); *G06F 2209/509* (2013.01)

(58) Field of Classification Search
None
See application file for complete search history.

(56) References Cited

U.S. PATENT DOCUMENTS

| 7,962,706 | B2 | 6/2011 | Davis |
| 2007/0174536 | A1* | 7/2007 | Nakagawa et al. ............... 711/2 |
| 2009/0063528 | A1 | 3/2009 | Yueh |
| 2009/0063795 | A1 | 3/2009 | Yueh |

OTHER PUBLICATIONS

Huang et al., Executing Mobile Applications on the Cloud: Framework and Issues, 2011.*

* cited by examiner

*Primary Examiner* — Mengyao Zhe
(74) *Attorney, Agent, or Firm* — Mattingly & Malur, PC

(57) ABSTRACT

An aspect of the invention is directed to a storage management computer for managing offloading of storage workload between a storage controller of a storage system and one or more host computers. The storage management computer comprises: a memory; and a controller operable to request a virtual machine management computer to register the storage controller as a host computer, and to send, to the virtual machine management computer, storage processes information of storage processes in the storage system which can be offloaded as virtual machines in order for the virtual machine management computer to register the storage processes as virtual machines.

14 Claims, 18 Drawing Sheets

Logical Volume Management Table (112-06)

| WWPN | LUN | VOL # |
|---|---|---|
| WWPN_1 | 0 | 1 |
| WWPN_2 | 0 | 2 |
| WWPN_3 | 0 | 3 |
| WWPN_4 | 0 | 3 |

Fig. 3

Data Processing Management Table (112-08)

| Process# | WWPN | LUN | Initiator WWPN | Processing Flag |
|---|---|---|---|---|
| P1 | WWPN_1 | 0 | WWPN_A, WWPN_B | |
| P2 | WWPN_2 | 0 | WWPN_B | Compression |
| P3 | WWPN_3 | 0 | WWPN_A | Compression |
| P4 | WWPN_4 | 0 | WWPN_C | |

Virtual Volume Management Table (302-04-04)

| WWPN | LUN | VLU # | Target WWPN | Target LUN |
|---|---|---|---|---|
| WWPN_3 | 0 | 3 | WWPN_4 | 0 |

Fig. 7

Data Processing Management Table (302-04-05)

| WWPN | LUN | Initiator WWPN | Processing Flag | Write Policy |
|---|---|---|---|---|
| WWPN_3 | 0 | WWPN_A | Compression | Write through |

402-05

Storage Controller Information Table

| Controller# | IP Address for virtual machine management | Processor (core) | Memory (GB) | CPU Usage % | Memory Usage % | IOPS |
|---|---|---|---|---|---|---|
| Controller_A | 192.168.1.1 | 16 (3 GHz) | 64 | 70 | 10 | 7000 |

Virtual Performance Information Table

| Process # | Controller # | Offloading Status | VM # | pIOPS | Processing Flag | vProcessor (cores) | vMemory (GB) | vProcessor Usage % | vMemory Usage % |
|---|---|---|---|---|---|---|---|---|---|
| P1 | Controller_A | - | - | 0 | - | 5 | 4 | 0 | 0 |
| P2 | Controller_A | Not offloaded | VM_D | 3000 | De-duplication | 5 | 4 | 96 | 96 |
| P3 | Controller_A | Not offloaded | VM_E | 2000 | Compression | 5 | 4 | 64 | 64 |
| P4 | Controller_A | - | - | 2000 | - | 5 | 4 | 0 | 0 |

| Host# | Management IP Address | Processor (core) | Memory (GB) | Processor Usage % | Memory Usage % |
|---|---|---|---|---|---|
| Host_A | 192.168.0.1 | 16 (3 GHz) | 64 | 50 | 50 |
| Host_B | 192.168.0.2 | 16 (3 GHz) | 64 | 10 | 10 |
| Host_C (Storage ControllerA) | 192.168.1.1 | 16 (3 GHz) | 64 | 70 | 10 |

Host Information Table

| VM# | Host | Status | vProcessor (Core) | vMemory (GB) | vProcessor Usage % | vMemory Usage % |
|---|---|---|---|---|---|---|
| VM_A | Host_A | Power on | 2 | 32 | 50 | 50 |
| VM_B | Host_A | Power on | 1 | 16 | 40 | 40 |
| VM_C | Host_B | Power on | 1 | 4 | 10 | 10 |
| VM_D (P2) | Host_C | Power on | 5 | 2 | 75 | 75 |
| VM_E (P3) | Host_C | Power on | 5 | 2 | 60 | 60 |

Virtual Machine Information Table

Fig. 13

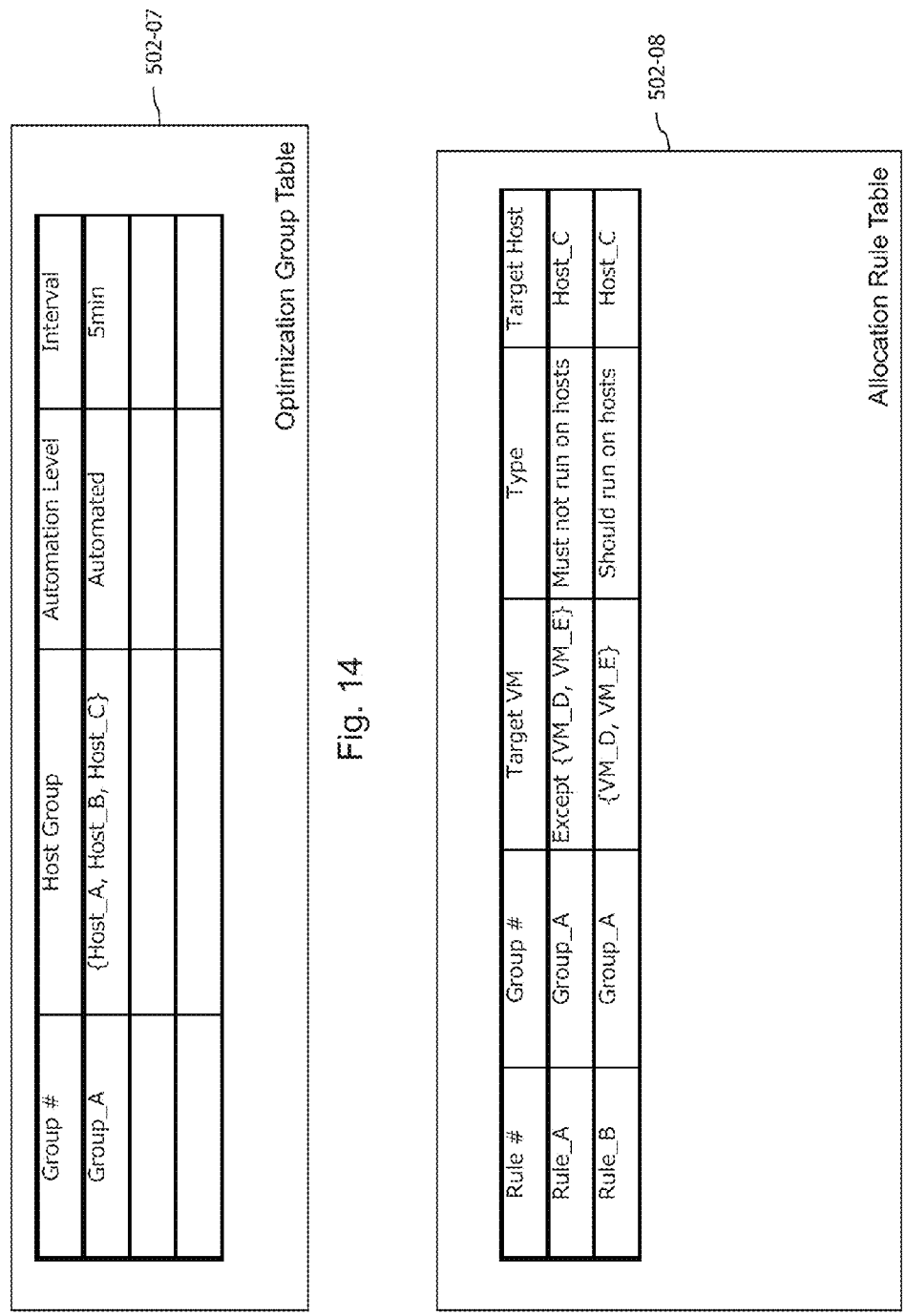

METHOD AND APPARATUS FOR OFFLOADING STORAGE WORKLOAD

BACKGROUND OF THE INVENTION

The present invention relates generally to storage systems and, more particularly, to reducing workload in a storage system.

The amount of digital data is growing rapidly. As a result, a storage subsystem is required to provide more storage capacity. To utilize storage resources, a storage subsystem provides data reduction features such as compression and de-duplication. However, these features consume more computing resources such as processor and memory of the storage subsystem. For improving data reduction workload, specialized hardware for processing such as compression and de-duplication is provided. This kind of hardware acts as gateway between server and storage.

U.S. Patent Application Publication No. 2009/0063528 discloses a method for de-duplicating redundant data in memory, storage, or both, comprising: providing a virtualization layer on a computer architecture comprising memory for temporarily storing data, and storage for persistently storing data. Also, VMware Inc. of Palo Alto, Calif., shows a method for aggregating computing capacity across a plurality of servers and dynamically allocating workload on these servers to optimize aggregated computing capacity distributed as VMware vSphere™ 4 Distributed Resource Scheduler (DRS) software.

With the specialized hardware approach, however, it is difficult to expand capacity according to the usage of data store, I/O, and processor/memory. Also, it is difficult to migrate from running process on the storage subsystem without disrupting existing connection between host and storage. US2009/0063528 does not show how to migrate from running process on the storage subsystem without disrupting existing connection between host and storage. VMware vSphere™ 4 DRS does not show how to allocate workloads between host and storage dynamically, especially for workload which is not virtualized storage process. VMware vSphere™ 4 DRS further fails to show how to distribute one storage workload to multiple servers after dividing the storage workload.

BRIEF SUMMARY OF THE INVENTION

Exemplary embodiments of the invention provide a storage management server that requests a virtual machine management server to register the storage controller of a storage subsystem as a host, which can run virtual machines. The storage management server acts as a gateway to the storage controller. It means all management messages between virtual machine management server/servers and the storage controller are received and replied at the storage management server. In addition, the storage management server requests the virtual machine management server to register storage processes on the storage controller as multiple VMs and reports performance data of the storage controller and processes to the virtual machine management server as performance data of VMs. The storage management server supports migration of the storage process (registered as a VM) from the storage controller to a server as if the running virtual machine were migrated from a server to another server. After deploying the storage process as a VM on the server, the storage management server configures a virtual LU and virtual FC port which has the same WWPN with the original FC port of storage subsystem, copies processing control tables related to the LU and FC port, and then switches the storage I/O path.

An aspect of the present invention is directed to a storage management computer for managing offloading of storage workload between a storage controller of a storage system and one or more host computers. The storage management computer comprises: a memory; and a controller operable to request a virtual machine management computer to register the storage controller as a host computer, and to send, to the virtual machine management computer, storage processes information of storage processes in the storage system which can be offloaded as virtual machines in order for the virtual machine management computer to register the storage processes as virtual machines.

In some embodiments, the controller is operable to create storage controller virtual machine instance data from a template of storage controller virtual machine for each of the storage processes which can be offloaded as virtual machines; and the storage processes information comprises the created data. The controller is operable: if the storage management computer is part of the storage system, to allocate an IP address of the storage system as an IP address of the storage controller, which is registered as a host computer, to communicate with the virtual machine management computer; and if the storage management computer is not part of the storage system, to allocate an IP address of the storage management computer as an IP address of the storage controller, which is registered as a host computer, to communicate with the virtual machine management computer.

In specific embodiments, the controller is operable to request the virtual machine management computer to add the storage controller registered as a host computer into an optimization group of host computers, and to register one or more allocation rules for allocating virtual machines among the host computers in the optimization group. Migration of virtual machines between the host computers in the optimization group is performed according to the one or more allocation rules. Upon receiving a virtual machine migration request from a destination host computer to migrate one or more storage processes registered as virtual machines, from the storage controller registered as a host computer to the destination host computer, the controller is operable to migrate the one or more storage processes registered as virtual machines, from the storage controller registered as a host computer to the destination host computer, via an offload target port on the storage controller.

In some embodiments, the controller is operable to create memory contents data from a template of storage controller virtual machine for each of the storage processes which can be offloaded as virtual machines, and to send the created memory contents data to the destination host computer, in order for the destination host computer to resume operation of the migrated one or more storage processes registered as virtual machines, after the migration, using the memory contents data.

In specific embodiments, upon receiving another virtual machine migration request from the destination host computer to migrate the one or more storage processes registered as virtual machines from the destination host computer back to the storage controller registered as a host computer, the controller is operable to activate a target port on the storage controller to switch storage I/O (Input/Output) to the target port, send a request to the destination host computer to stop the one or more storage processes registered as virtual machines, and delete an offload target port on the storage controller used for offloading the one or more storage processes registered as virtual machines to the destination host computer.

Another aspect of the invention is directed to a method for managing offloading of storage workload between a storage controller of a storage system and one or more host computers, by a storage management computer including a processor and a memory. The method comprises: requesting a virtual machine management computer to register the storage controller as a host computer; and sending, to the virtual machine management computer, storage processes information of storage processes in the storage system which can be offloaded as virtual machines in order for the virtual machine management computer to register the storage processes as virtual machines.

Another aspect of this invention is directed to a computer-readable storage medium storing a plurality of instructions for controlling a data processor of a storage management computer to manage offloading of storage workload between a storage controller of a storage system and one or more host computers. The plurality of instructions comprise: instructions that cause the data processor to request a virtual machine management computer to register the storage controller as a host computer; and instructions that cause the data processor to send, to the virtual machine management computer, storage processes information of storage processes in the storage system which can be offloaded as virtual machines in order for the virtual machine management computer to register the storage processes as virtual machines.

These and other features and advantages of the present invention will become apparent to those of ordinary skill in the art in view of the following detailed description of the specific embodiments.

BRIEF DESCRIPTION OF THE DRAWINGS

FIG. 3 shows an example of the logical volume management table.

FIG. 4 shows an example of the data processing management table.

FIG. 6 shows an example of the virtual volume management table.

FIG. 7 shows an example of the data processing management table.

FIG. 9 shows an example of the storage controller information table.

FIG. 10 shows an example of the virtual performance information table.

FIG. 12 shows an example of the host information table.

FIG. 13 shows an example of the virtual machine information table.

FIG. 14 shows an example of the optimization group table.

FIG. 15 shows an example of the allocation rule table.

DETAILED DESCRIPTION OF THE INVENTION

Figure 1:
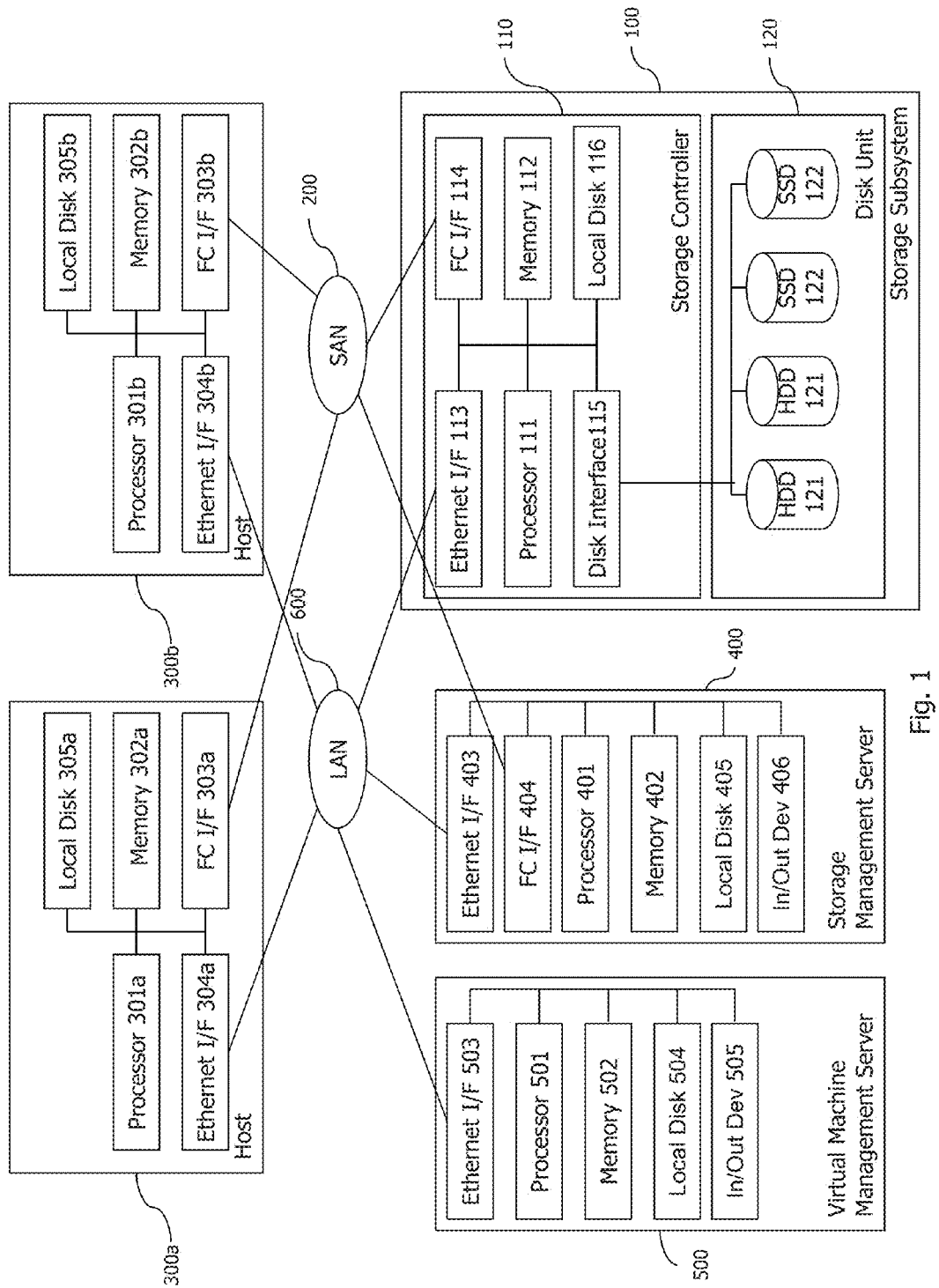
FIG. 1 illustrates an example of a hardware configuration of a system in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for offloading storage workload.

Embodiment 1

Dynamic Storage Compression Process Offloading to Low Usage Server

The first embodiment discloses how to optimize server and storage workloads and how to offload storage compression process to a low usage server (host) while volume is used.

FIG. 1 illustrates an example of a hardware configuration of a system in which the method and apparatus of the invention may be applied. It includes Storage Subsystem 100, SAN (Storage Area Network) 200, Host Computer 300, Storage Management Server 400, Virtual Machine Management Server 500, and Local Area Network (LAN) 600. Storage Subsystem 100 includes Storage Controller 110 and Disk Unit 120. Storage Controller 110 performs disk I/O functionality with Host Computer 300 using Fibre Channel (FC) Protocol via SAN 200. Disk Unit 120 has plural storage devices such as Hard Disk Drive (HDD) and/or Solid State Drive (SSD). Storage Controller 110 has Processor 111, Memory 112, Ethernet Interface (Ethernet I/F) 113, FC Interface (FC I/F) 114, Disk Interface 115, and Local Disk 116. Storage Controller 110 combines Disk Unit 120 and configures RAID (Redundant Arrays of Inexpensive Disks), and then provides Volume (LU: Logical Unit) to Host Computer 300. These functions are executed by application programs shown in FIG. 2 and FIG. 5 (Logical Volume I/O Control, Physical Disk Control, and so on). Ethernet I/F 113 is an interface to LAN 600. FC I/F 114 is an interface to SAN 200. Disk Interface 115 is an interface to Disk Unit 120.

Host Computer 300 has Processor 301, Memory 302, FC Interface (FC I/F) 303, Ethernet Interface (Ethernet I/F) 304, and Local Disk 305. Ethernet I/F 304 is an interface to LAN 600. FC I/F 304 is an interface to SAN 200. FIG. 1 shows two host computers 300a, 300b. Host Computer 300 can be not only physical host but also virtual host such as virtual machine. Storage Management Server 400 has Processor 401, Memory 402, Ethernet Interface (Ethernet I/F) 403, FC Interface (FC I/F) 404, Local Disk 405, and Input/Output Device 406. Ethernet I/F 403 is an interface to LAN 600. FC I/F 404 is an interface to SAN 200. Input/Output Device 406 is a user interface such as monitor, keyboard, and mouse which the system administrator uses. Virtual Machine Management Server 500 has Processor 501, Memory 502, Ethernet Interface (Ethernet I/F) 503, Local Disk 504, and Input/Output Device 505. Ethernet I/F 503 is an interface to LAN 600. Input/Output Device 505 is a user interface such as monitor, keyboard, and mouse which the system administrator uses.

FC I/F 114 of Storage Controller 110, FC I/F 303 of Host 300 and FC I/F 404 of Storage Management Server 400 are supposed to support NPIV. NPIV stands for N_Port ID Virtualization. It allows the FC I/F (114, 303, 404) to have virtual WWPNs (WWPN: World Wide Port Name). In this disclosure, the term of "WWPN" includes virtual WWPN realized by NPIV.

Figure 2:
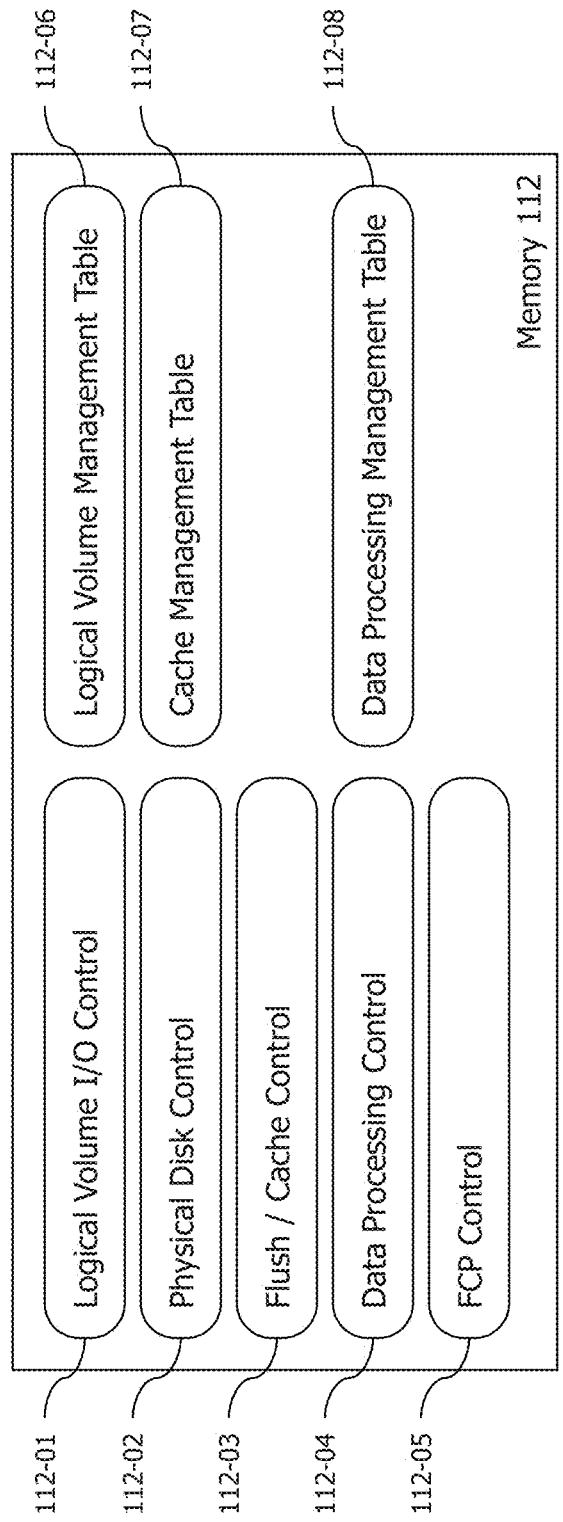
FIG. 2 shows an example of a software module configuration of the memory in the storage subsystem according to the first embodiment.

FIG. 2 shows an example of a software module configuration of the memory 112 in the storage subsystem 100 according to the first embodiment. It includes logical volume I/O control 112-01, physical disk control 112-02, flush/cache control 112-03, data processing control 112-04, FCP (Fibre Channel Protocol) control 112-05, logical volume management table 112-06, cache management table 112-07, and data processing management table 112-08.

FIG. 3 shows an example of the logical volume management table 112-06. The "WWPN" field represents the WWPN of the FC I/F 114 on the storage subsystem 100. The "LUN" field represents the LU Number on the storage subsystem. The "VOL #" field represents the volume on the storage subsystem. As seen in FIG. 3, when the host computer 300 accesses WWPN_3, it can connect to LUN 0.

Figure 5:
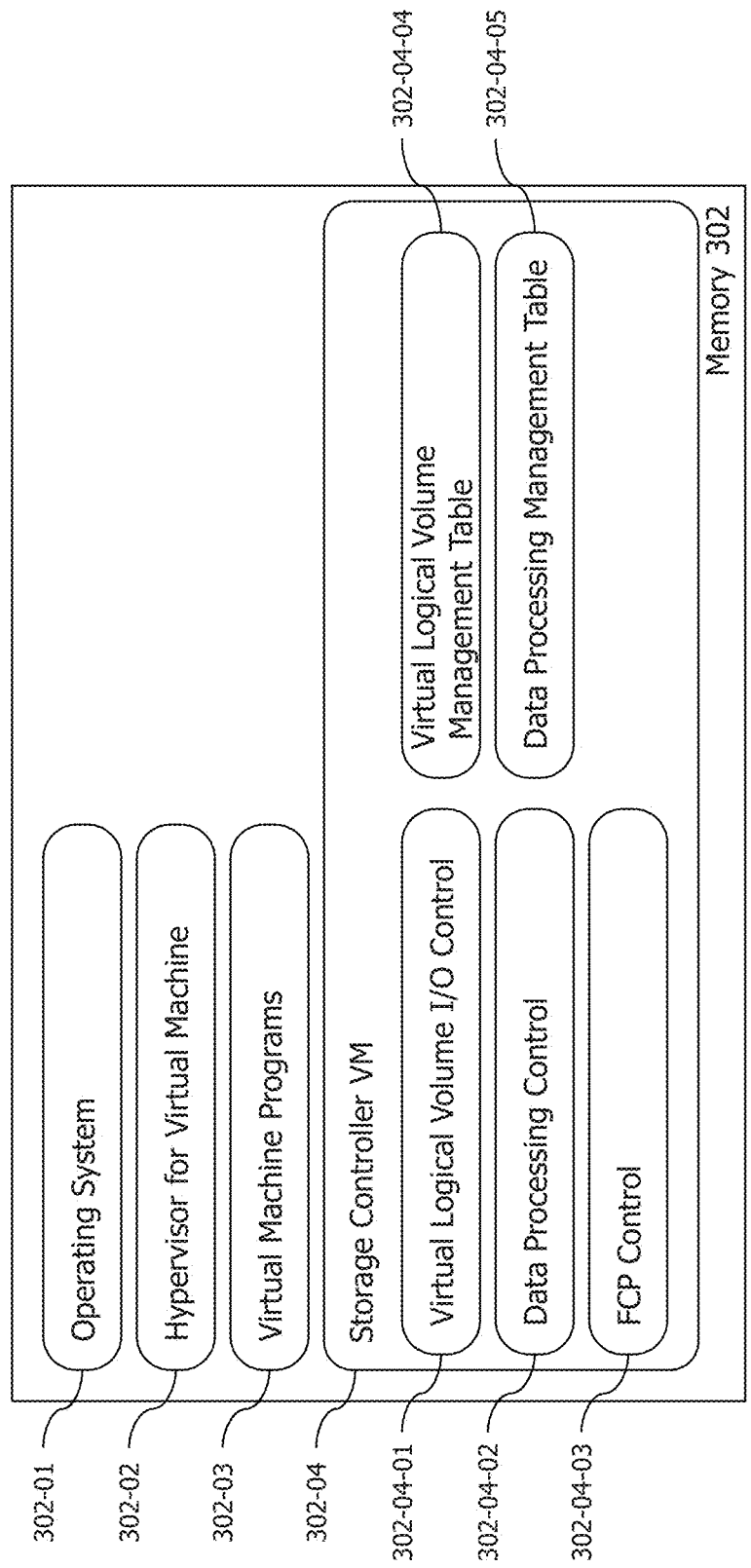
FIG. 5 shows an example of a software module configuration of the memory in the host according to the first embodiment.

FIG. 4 shows an example of the data processing management table 112-08. The "Process #" field represents the identifier of each data processing. The "WWPN" field and "LUN" field represent the same context of each "WWPN" field and "LUN" field of the logical volume management table 112-06 in FIG. 3. The "Initiator WWPN" field represents the list of WWPNs of the Initiator of host and/or other storage subsystems which include storage controller VM 302-04 as described below (FIG. 5). It allows the storage subsystem 100 to restrict access to the LU to achieve LUN Security. The "Processing Flag" field represents data processing options such as "compression" or "de-duplication" to the input/output data which is transmitted between the Initiator represented by "Initiator WWPN" field and the target volume associated with the "WWPN" and "LUN" fields.

FIG. 5 shows an example of a software module configuration of the memory 302 in the host 300 according to the first embodiment. It includes operating system 302-01, hypervisor for virtual machine 302-02, virtual machine programs 302-03, and storage controller VM 302-04. Hypervisor for virtual machine 302-02 is a program that allows virtual machine programs 302-03 and storage controller VM 302-04 to share hardware resources (Processor 301, Memory 302, FC I/F 303, Ethernet I/F 304 and Local Disk 305) of host 300. Virtual machine programs 302-03 and storage controller VM 302-04 are software implementations of a computing environment in which an operating system and/or programs can be installed and run. Hypervisor for virtual machine 302-02 controls allocating the hardware resources and making sure that the virtual machines cannot disrupt each other. The storage controller VM 302-04 is a processing module that acts as storage controller to offload the storage controller 110 processing. The storage controller VM 302-04 has target control units which are offloaded from the storage controller 110, and related control units to offload target control units. In this embodiment 1, the storage controller VM 302-04 includes virtual volume I/O control 302-04-01, data processing control 302-04-02, FCP control 302-04-03, virtual volume management table 302-04-04, and data processing management table 302-04-05. The storage controller VM 302-04 is allocated by the management server 400 as a form of Virtual Machine (VM), but it is not limited to this.

FIG. 6 shows an example of the virtual volume management table 302-04-04. The storage controller VM 302-04 involves the storage virtualization technology. The storage controller VM 302-04 and storage subsystem 100 are connected to each other. When the host computer 300 connects to the Virtual LU on the storage controller VM 302-04, it can reach the LU on the storage subsystem 100 by connecting the virtual LU on the storage controller VM 302-04 and the LU on the storage subsystem 100. The "WWPN" field represents the WWPN of FC I/F 303 associated with the storage controller VM 302-04. The "LUN" field represents the virtual LUN on the storage controller VM 302-04. The "V-VOL #" field represents the virtual volume on the storage controller VM 302-04. The "Target WWPN" field represents the target WWPN of the storage subsystem 100 in order to connect to the storage subsystem 100. The "Target LUN" field represents the LUN on the storage subsystem 100 associated with the virtual LUN on the storage controller VM 302-04.

FIG. 7 shows an example of the data processing management table 302-04-05. The "WWPN" field and "LUN" field represent the same context of each "WWPN" field and "LUN" field of the virtual volume management table 302-04-04 in FIG. 6. The "Initiator WWPN" field represents the WWPN of the initiator host and/or storage subsystems which include other storage controller VM 302-04. It allows the storage controller VM 302-04 to restrict access to the virtual LU to achieve LUN Security. The "Processing Flag" field represents data processing options such as "compression" or "de-duplication" to the input/output data which is transmitted between the initiator represented by "Initiator WNPN" field and the target volume associated with the "WWPN" and "LUN" fields of the data processing management table 302-04-05. The "Write Policy" field represents the timing of write to the LUN on the storage subsystem 100 (e.g., "Write through," "Write back," and so on). Write-back is a caching method in which modifications to data in the virtual volume are not copied to the volume in the storage subsystem until absolutely necessary. In contrast, a write-through performs all write operations in parallel—data is written to the virtual volume and the volume in the storage subsystem simultaneously. Write-back yields somewhat better performance than write-through because it reduces the number of write operations to the main memory. With this performance improvement comes a slight risk that data may be lost if the system crashes.

Figure 8:
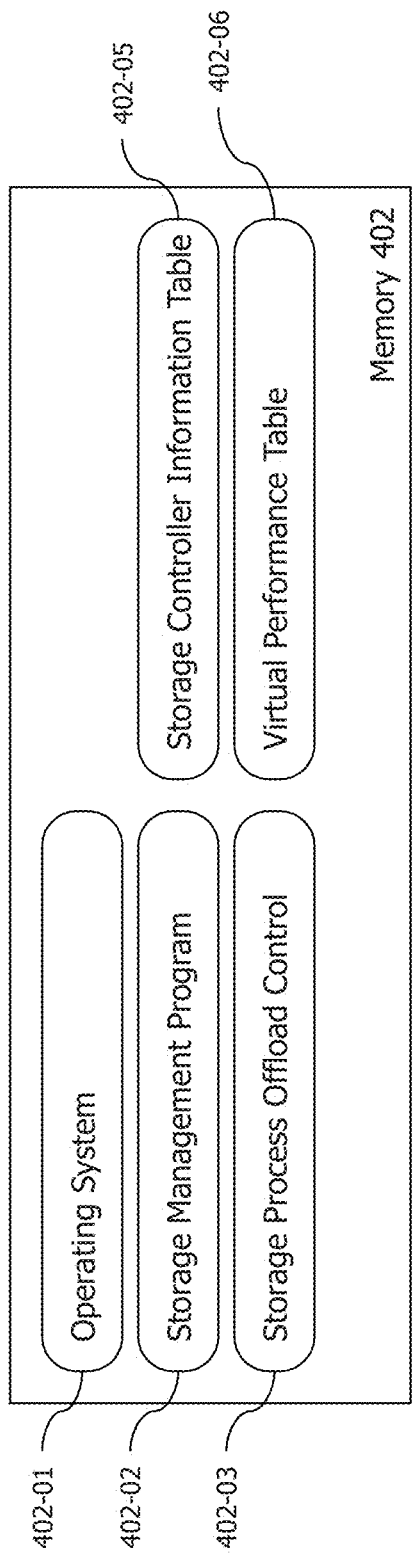
FIG. 8 shows an example of a software module configuration of the memory in the storage management server.

FIG. 8 shows an example of a software module configuration of the memory 402 in the storage management server 400. It includes operating system 402-01, storage management program 402-02, storage process offload control 402-03, storage controller information table 402-05, and virtual performance table 402-06.

FIG. 9 shows an example of the storage controller information table 402-05. The "Controller #" field represents an identifier of the storage controller 110. The "IP Address for virtual machine management" field represents an IP Address for communicating with virtual machine management server 500 to manage virtual machine. The "Processor" field represents a capacity of the processor 301 of the storage controller 110. The "Memory" field represents a capacity of the memory 302 of the storage controller 110. The "Processor Usage" field represents a percentage of processor 301 usage. The "Memory Usage" field represents a percentage of memory 302 usage. The "IOPS" field represents an average IOPS (Input/Output Per Second) of the storage controller 110.

FIG. 10 shows an example of the virtual performance information table 402-06. The "Process #" field represents the identifier of each data processing of storage system. The "Controller #" field represents the identifier of storage controller 110 on which the process is running. The "offloading status" field represents a status of offloading of data processing. The "VM #" field represents an identifier of the process which is registered as VM on the virtual machine management server 500 and identified using this identifier. The "pIOPS" field represents an average IOPS of the each data processing on the Data Processing Control 112-04. The "vProcessor" field represents a capacity of the processor of the storage controller VM 302-04 which is pre-defined. The "vMemory" field represents a capacity of the memory of the storage controller VM 302-04 which is pre-defined. The "vProcessor Usage" field represents a percentage of vProcessor usage. The "vMemory Usage" field represents a percentage of vMemory usage.

The storage management program 402-02 collects performance information from the storage controller 110 and updates the values of the "Processor Usage," "Memory usage," and "IOPS" of the storage controller information table 402-05 and the values of the "pIOPS" of the Virtual Performance Information Table 402-06 by the conventional way (e.g., SNMP: Simple Network Management Protocol, and so on) and appropriate timing (e.g., at fixed intervals). Then, the storage management program 402-02 estimates a percentage of vProcessor usage using a pre-defined formula and stores the value of "vProcessor Usage" field of the Virtual Performance Information Table 402-06. Formula-1 shows an example of the formula.

$$f(x) = \frac{pIPOPS}{IOPS} \times \frac{Processor}{vProcessor} \times ProcessorUsage \qquad \text{Formula-1}$$

Also, the storage management program 402-02 estimates a percentage of vMemory usage using a pre-defined formula and stores the value of "vMemory Usage" field of the Virtual Performance Information Table 402-06. Formula-2 shows an example of the formula.

$$f(x) = \frac{pIPOPS}{IOPS} \times \frac{Memory}{vMemory} \times MemoryUsage \qquad \text{Formula-2}$$

Figure 11:
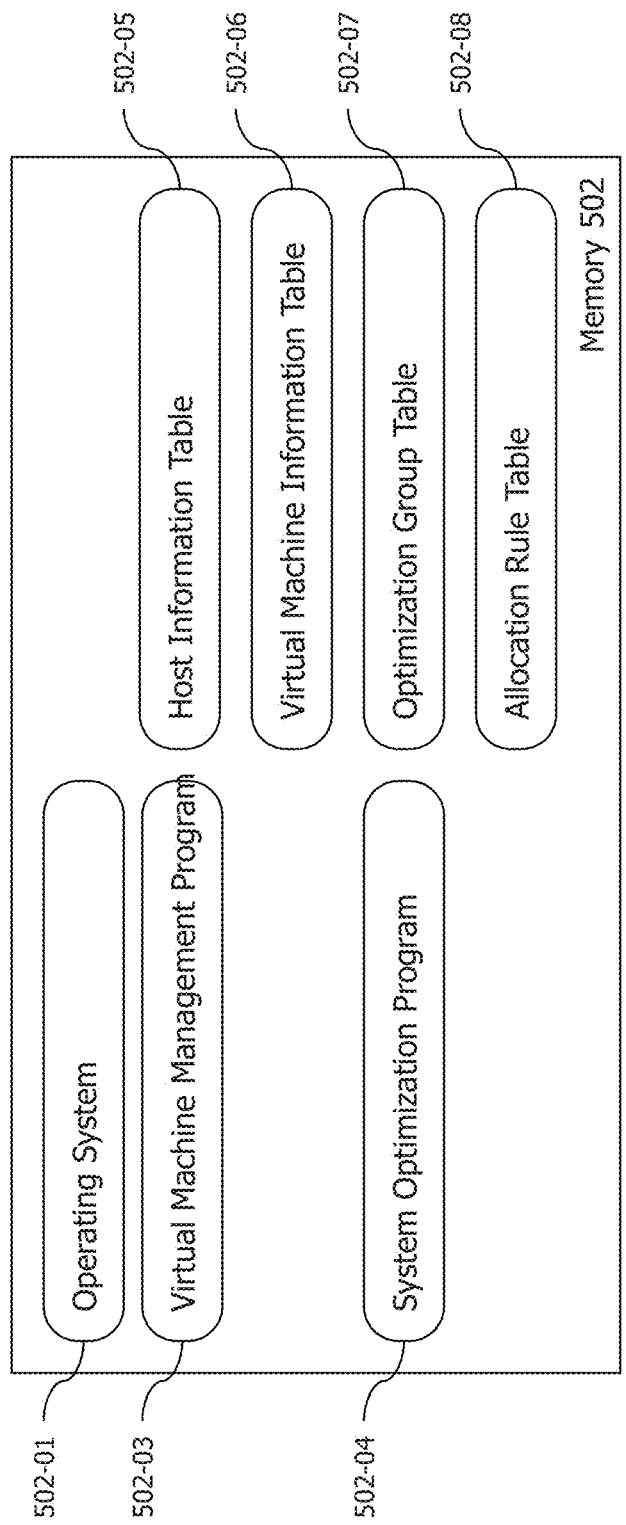
FIG. 11 shows an example of a software module configuration of the memory in the virtual machine management server.

FIG. 11 shows an example of a software module configuration of the memory 502 in the virtual machine management server 500. It includes operating system 502-01, virtual machine management program 502-03, system optimization program 502-04, host information table 502-05, virtual machine information table 502-06, optimization group table 502-07, and allocation rule table 502-08.

FIG. 12 shows an example of the host information table 502-05. The "Host #" field represents an identifier of the host 300 and storage controller 110. The "Management IP Address" field represents an IP address of the Ethernet I/F 304 of host 300 and Ethernet I/F 403 of storage management server 400. The "Processor" field represents a capacity of the processor 301 of the host 300 and a capacity of the processor 111 of the storage controller 110. The "Memory" field represents a capacity of the memory 302 of the host 300 and a capacity of the memory 112 of the storage controller 110. The "Processor Usage" field represents a percentage of processor 301 usage and a percentage of the processor 111 usage. The "Memory Usage" field represents a percentage of memory 302 usage and a percentage of memory 112 usage.

FIG. 13 shows an example of the virtual machine information table 502-06. The "VM #" field represents an identifier of the VM. The "Host" field represents a host 300 on which the VM is running. The "Status" field represents a status of VM. The "vProcessor" field represents a capacity of the vProcessor of the VM. The "vMemory" field represents a capacity of the vMemory of the VM. The "vProcessor Usage" field represents a percentage of vProcessor usage. The "vMemory Usage" field represents a percentage of vMemory usage.

The virtual machine management program 502-03 collects performance information from the host 300 and storage management server 400 and updates the values of the "Processor Usage" and "Memory usage" of the host information table 502-05 and the values of the "vProcessor Usage" and "vMemory usage" of the virtual machine information table 502-06.

FIG. 14 shows an example of the optimization group table 502-07. The "Group #" field represents an identifier of the host group. The "Host Group" field represents hosts 300 on which the VMs are re-allocated based on the utilization. The "Automation Level" field represents a level of automation of VM migration. The "interval" field represents an interval of evaluating the balance of load of hosts.

FIG. 15 shows an example of the allocation rule table 502-08. The "Rule #" field represents an identifier of the rule. The "Group #" field represents an identifier of the group which is related to the "Group #" field of the optimization group table 502-07. The "Type" field represents a type of rules which are pre-defined. The "Target VM" field represents VMs of the target of this rule. The "Target Host" field represents Hosts 300 of the target of this rule. For example, the first record of FIG. 15 means "VMs except VM_D and VM_E must not run on Host C."

Figure 16A:
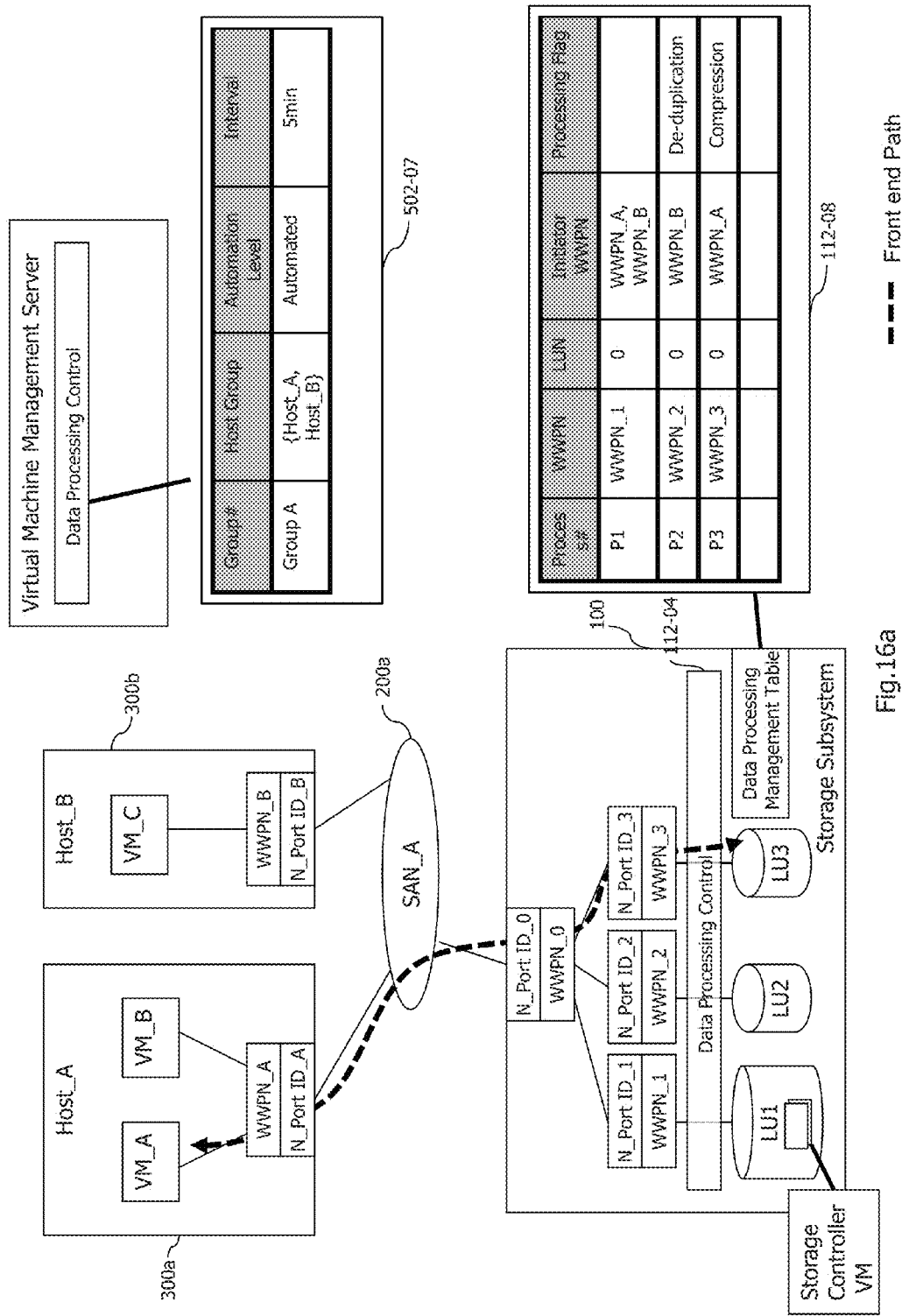
FIG. 16a shows the first status of the offloading process.
Figure 16B:
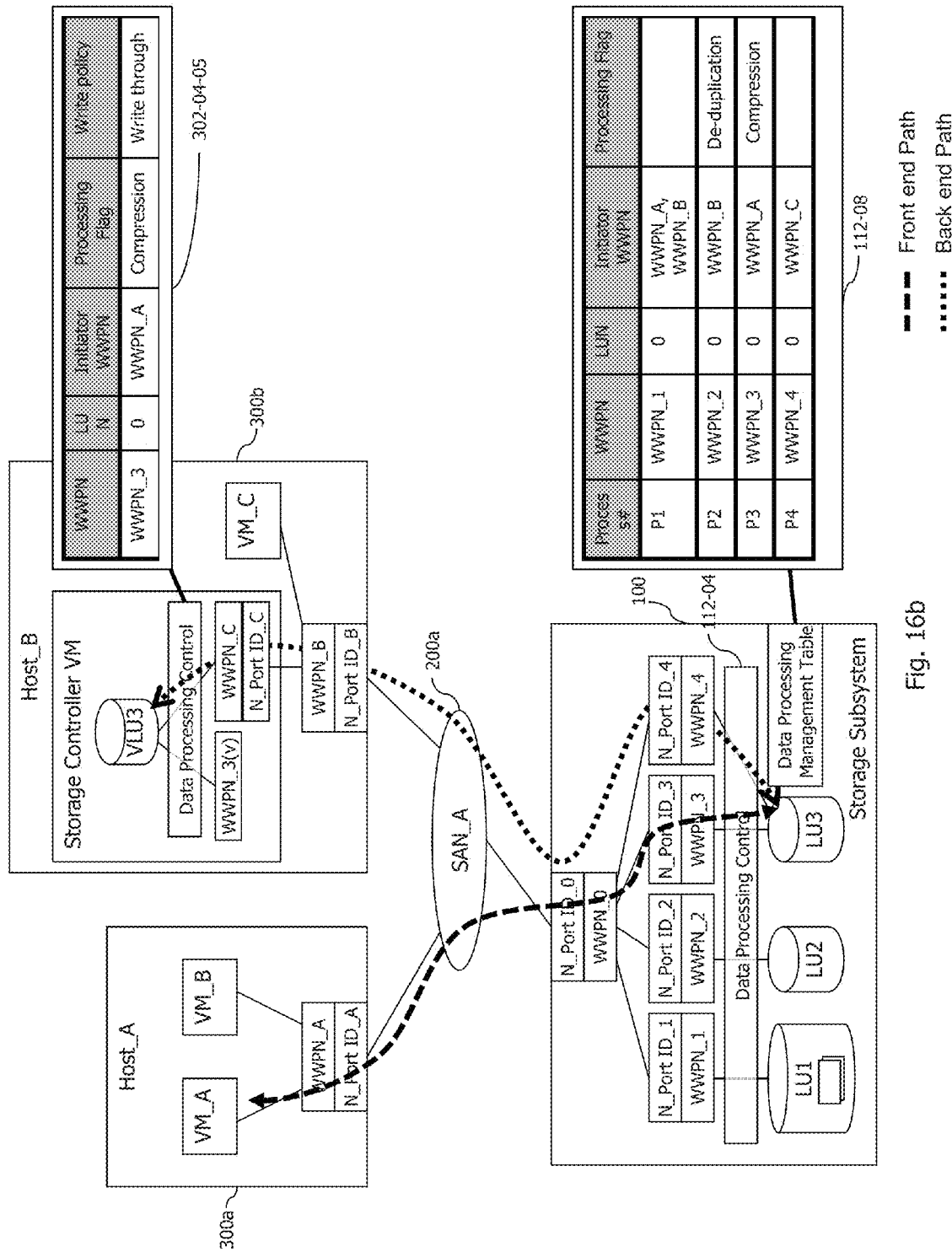
FIG. 16b shows the second status of the offloading process after the steps of FIG. 17, FIG. 18, FIG. 19, and step 04-06 of FIG. 20.
Figure 16C:
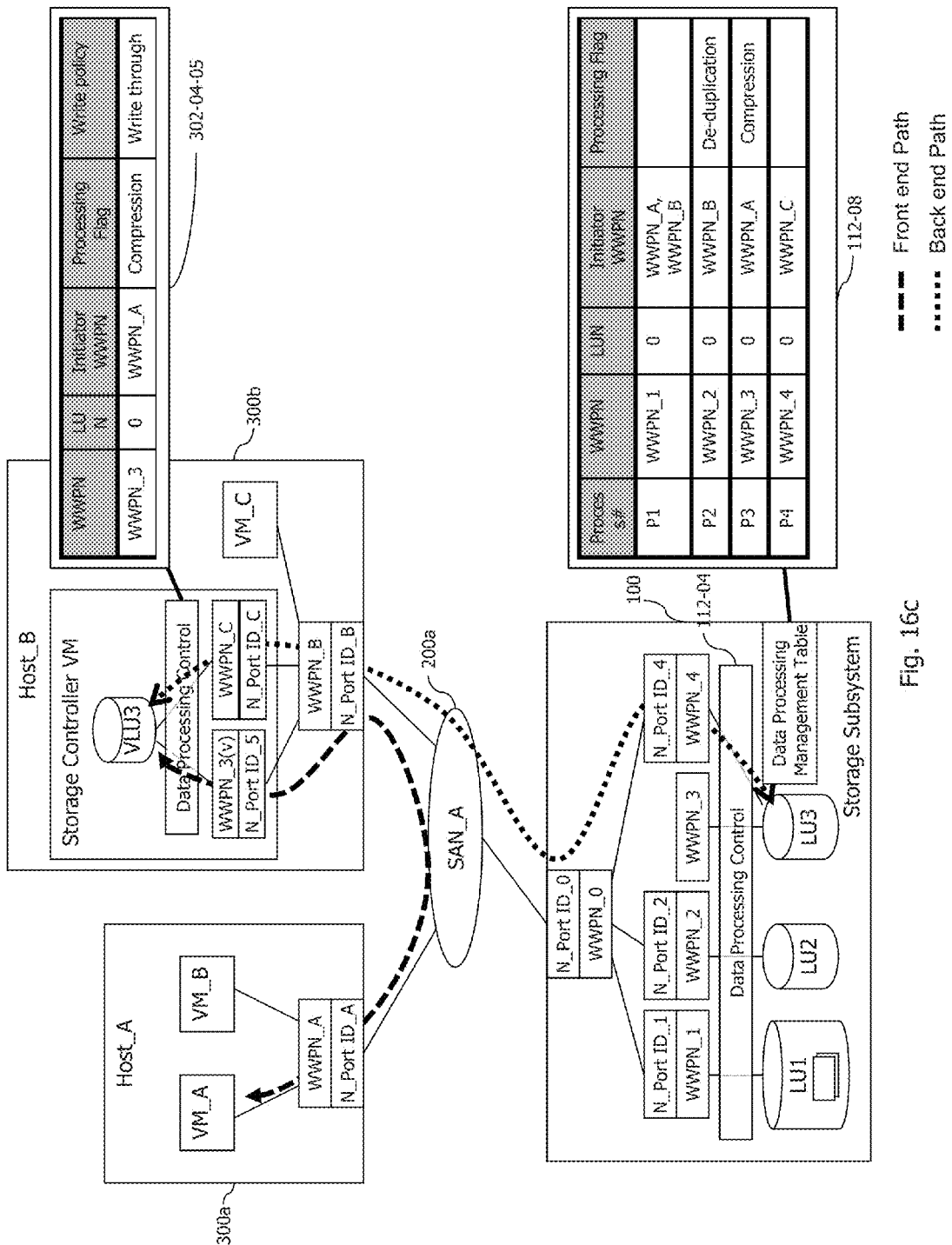
FIG. 16c shows the third status of the offloading process after step 04-7 of FIG. 20.

FIGS. 16a-16c illustrate an example of the offloading process of compression processing of storage subsystem using RSCN according to the first embodiment. RSCN stands for Registered State Change Notification. It sends notification to Fibre Channel nodes in the SAN fabric when the fabric Simple Name Service (SNS) database is changed (e.g., adding or removing a disk (target device), creating a new zone, etc.). This embodiment applies RSCN and NPIV to the storage subsystem 100 for offloading storage process to the host 300.

FIG. 16a shows the first status of the offloading process. The host 300a (which can be a physical host or a virtual host) connects to the storage subsystem 100 using Fibre Channel via the SAN 200a. The host 300a has WWPN_A, N_Port ID_A connected to the SAN 200a. The VM_A and VM_B are running on the host 300a. The host 300b (which can be a physical host or a virtual host) connects to the storage subsystem 100 using Fibre Channel via the SAN 200a. The host 300b has WWPN_B, N_Port ID_B connected to the SAN 200a. The VM_C is running on the host 300b. The first storage subsystem has WWPN_0, N_Port ID_0 which is connected to the SAN 200a. The first storage subsystem has WWPN_1, N_Port ID_1 which is connected to LU1 and to the SAN 200a through WWPN_0, N_Port ID_0. The first storage subsystem has WWPN_2, N_Port ID_2 which is connected to LU2 and to the SAN 200a through WWPN_0, N_Port ID_0. The first storage subsystem has WWPN_3, N_Port ID_3 which is connected to LU3 and to the SAN 200a through WWPN_0, N_Port ID_0. The data processing management table 112-08 is configured as shown in FIG. 11a, which means the host 300a and the host 300b are allowed to access LU1 via FC port (WWPN_A) of the host 300a, FC port (WWPN_B) of the host 300b, and FC port (WWPN_1) of the storage subsystem 100. Also, it means that the host 300b is allowed to access LU2 via FC port (WWPN_B) of the host 300b and FC port (WWPN_2) of the storage subsystem 100, and the data processing control 112-04 de-duplicates the data transmitted via these ports either post-process or in-line. In the same way, it means that the host 300a is allowed to access LU3 via FC port (WWPN_A) of the host 300a and FC port (WWPN_3) of the storage subsystem 100, and the data processing control 112-04 compresses and de-compresses the data transmitted via these ports either post-process or in-line. The optimization group table 502-07 is configured as shown in FIG. 11a, which means the host 300a (HOST_A) and the host 300b (HOST_B) are configured as a member of the host group (Group A), and the virtual machine management server monitors the performance of these hosts and VMs on the hosts, and lets VMs migrate without approval from system administrator if the loads of the hosts are unbalanced.

Figure 17:
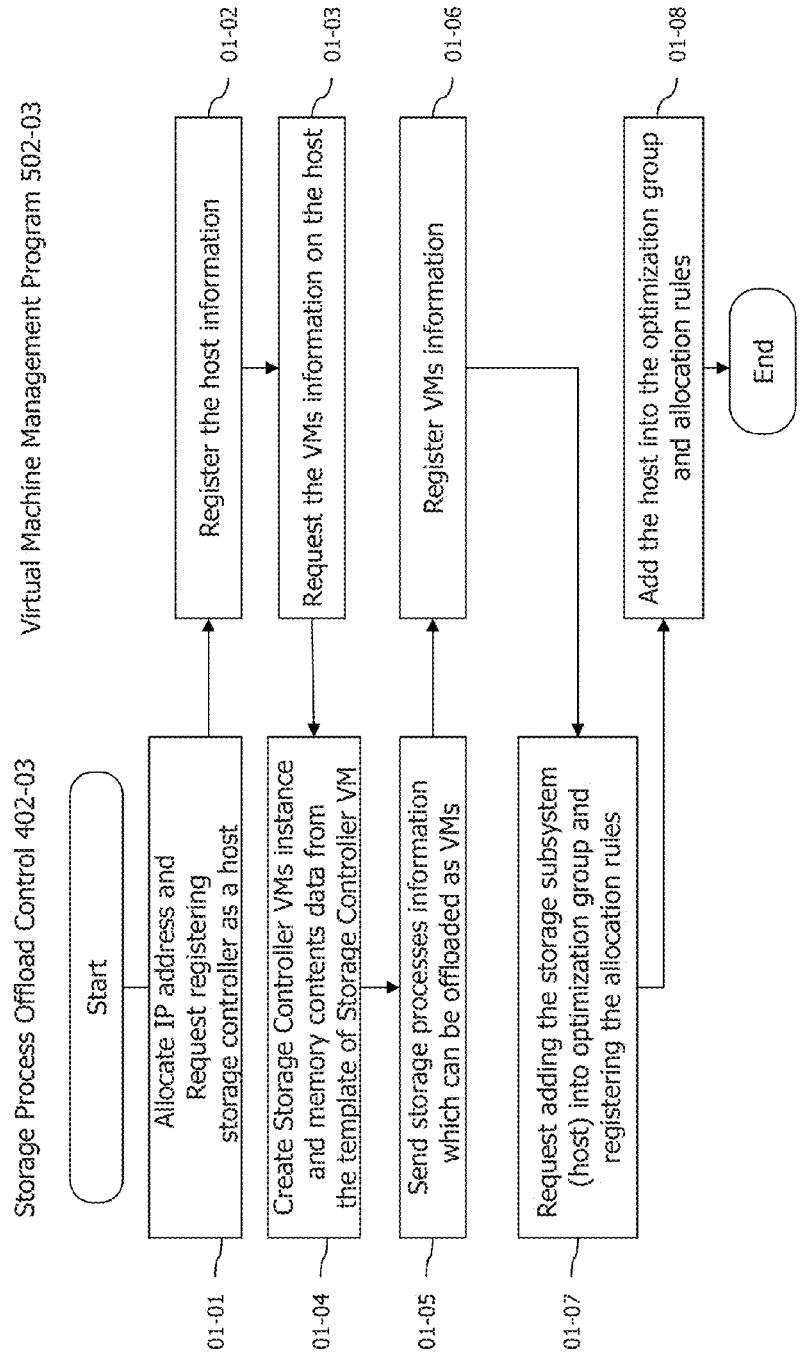
FIG. 17 is an example of a flow diagram illustrating a process flow of the storage process offload control as executed by the storage management server, and of the virtual machine management program as executed by the virtual machine management server, for registering the storage subsystem into the virtual machine management server, according to the first embodiment.

FIG. 17 is an example of a flow diagram illustrating a process flow of the storage process offload control 402-03 as executed by the storage management server 400, and of the virtual machine management program 502-03 as executed by the virtual machine management server 500, for registering the storage subsystem into the virtual machine management server, according to the first embodiment. This diagram starts when the storage process offload control 402-03 receives a request from the system administrator to add the storage controller 110 to the optimization group (Group A) as a host.

In step 01-01, the storage process offload control 402-03 allocates an IP address on the Ethernet I/F 403 as an IP address of the storage controller (Host_C) and stores the IP address in the "IP Address for virtual machine management"

field of the storage controller information table 402-05. Then, the storage process offload control 402-03 sends a request for registering storage controller 110 as a host (Host_C) to the virtual machine management program 502-03. The request includes information such as processor size and memory size using the "Processor" field value and "Memory" field value of storage controller information table 402-05, and the IP address. By sending IP address which is assigned on the storage management server 400, it means all management packets for HOST_C are sent to the storage management server 400. In an alternative embodiment, the storage management server 400 is part of the storage subsystem 100, and the storage process offload control 402-03 allocates an IP address of the storage subsystem 100 as an IP address of the storage controller (Host_C).

In step 01-02, the virtual machine management program 502-03 registers the storage controller information on the host information table 502-05. In step 01-03, the virtual machine management program 502-03 requests the VMs information running on the storage controller 110.

In step 01-04, the storage process offload control 402-03 selects processes which has only offloadable processing flag data in the "Processing Flag" field of virtual performance information table 402-06. In this embodiment 1, it is supposed "de-duplication" and "compression" are pre-defined as the offloadable processing flag data. In the case of FIG. 10 which shows an example of virtual performance information table 402-06, the P2 and P3 processes are selected according to the "Processing Flag" field value. Then, the storage process offload control 402-03 creates storage controller VM instance data which includes configuration data and virtual disk data. The VM instance data are created from template of storage controller VM for each selected processes, and are stored on the LU1 which can be accessed from host 300a and host 300b. The configuration data includes a VM identifier (VM #), a stored location of VM instance data (in this embodiment, VM data is stored in the LU1 of storage subsystem 100), virtual processor size, virtual memory size, virtual network interface, virtual disk file size, file path to the virtual disk, and so on. As the virtual processor size and virtual memory size configuration, the values of the "vProcessor" and "vMemory" field of virtual performance information table 402-06 are applied. Also, the storage process offload control 402-03 creates memory contents data from the template of storage controller VM for each selected processes, and stores them on the storage which can be accessed from storage management server 400 (e.g., Local Disk 405). The memory contents data is a dump of the virtual memory contents of the storage controller VM.

In step 01-05, the storage process offload control 402-03 sends selected processes' configuration information which is created in step 01-04. In step 01-06, the virtual machine management program 502-03 registers the received processes' configuration information as VM into the virtual machine information table 502-06.

In step 01-07, the storage process offload control 402-03 sends a request for adding the storage controller host (Host_C) into an optimization group (Group_A) of optimization group table 502-07, and adding the allocation rules. FIG. 15 shows an example of the allocation rule table 502-08. The "Rule A" of FIG. 15 means "VMs except VM_D and VM_E must not run on Host C" which prohibits VMs to migrate to the storage controller (HOST_C) except storage controller VM (VM_D and VM_E). The "Rule B" of FIG. 15 means "VMs (VM_D and VM_E) should run on Host C" which prefers storage controller VMs (VM_D and VM_E) to migrate to the storage controller (HOST_C).

In step 01-08, the virtual machine management program 502-03 adds the storage controller host (Host_C) into an optimization group (Group_A) of optimization group table 502-07, and adds the received allocation rules. FIG. 14 and FIG. 15 show the tables after step 01-08.

Figure 18:
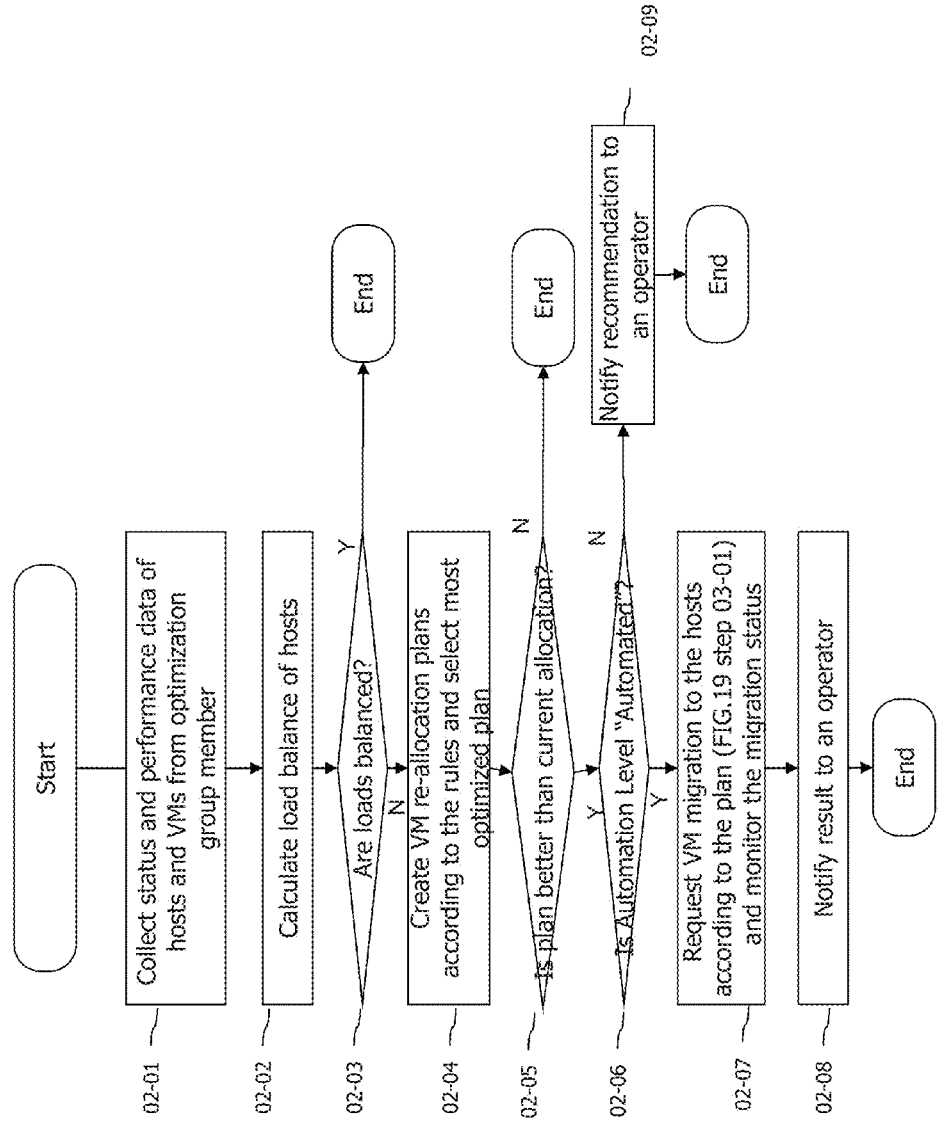
FIG. 18 is an example of a flow diagram illustrating a process flow of the system optimization program as executed by the virtual machine management server according to the first embodiment.

FIG. 18 is an example of a flow diagram illustrating a process flow of the system optimization program 502-03 as executed by the virtual machine management server 500 according to the first embodiment. This diagram is executed for each optimization group of the optimization group table 502-07 at intervals as "Interval" field value of the optimization group table 502-07.

In step 02-01, the system optimization program 502-03 collects status and performance data of hosts and VMs from optimization group member. When the storage management server 400 receives the request for status and performance data of storage controller (Host_C), the storage management server 400 replies with the status and performance information using the data stored in the virtual performance information table 402-06 as VM's status and performance data.

In step 02-02, the system optimization program 502-03 calculates the balance of load of optimization group members by the conventional way. For example, a standard deviation of processor usage is calculated using Formula-3 below (sigma: standard deviation, n: host number, U: processor usage of host, M: average of processor usage of hosts). In the case of host performance of FIG. 12, standard deviation of processor usage (S_current) is 40.

$$\text{sigma} = \sqrt{\frac{1}{n-1}\sum_{i=1}^{n}(U_i - M)^2} \qquad \text{Formula-3}$$

In step 02-03, the system optimization program 502-03 evaluates whether the load is balanced or not by comparing the standard deviation value to a threshold which is pre-defined. If the load is balanced, the process ends; otherwise, the program proceeds to step 02-04.

In step 02-04, the system optimization program 502-03 creates VM re-allocation plans according to the rules regarding this optimization group (Group_A) by the conventional way, and calculates the balance of each plan after executing the plan by the same way of step 02-02. Then, the system optimization program 502-03 selects the best plan. For example, the plan which has the smallest standard deviation value (S_plan) is selected.

In step 02-05, if the selected plan is better than current VM allocation (e.g., if the S_plan is smaller than the S_current), the program proceeds to step 02-06; otherwise, the process ends. In step 02-06, if the "Automation Level" field value of optimization group table 502-07 is "automated," the program proceeds to step 02-07; otherwise, the program proceeds to step 02-09. In step 02-09, the system optimization program 502-03 notifies the re-allocation plan to system administrator by conventional way such as email, GUI, and so on.

In step 02-07, the system optimization program 502-03 requests VM migration to the hosts according to the plan. In this embodiment, it is supposed that the system optimization program 502-03 requests Host_B (host 300b) and Host_C (storage controller 400) to migrate VM_E (P2: storage controller VM) from Host_C to Host_B. Then, the system optimization program 502-03 monitors the migration status. If the migrations according to the plan are finished, the program proceeds to step 02-08. In step 02-08, the system optimization program 502-03 notifies the result to the system administrator by conventional way such as email, GUI, and so on.

Figure 19:
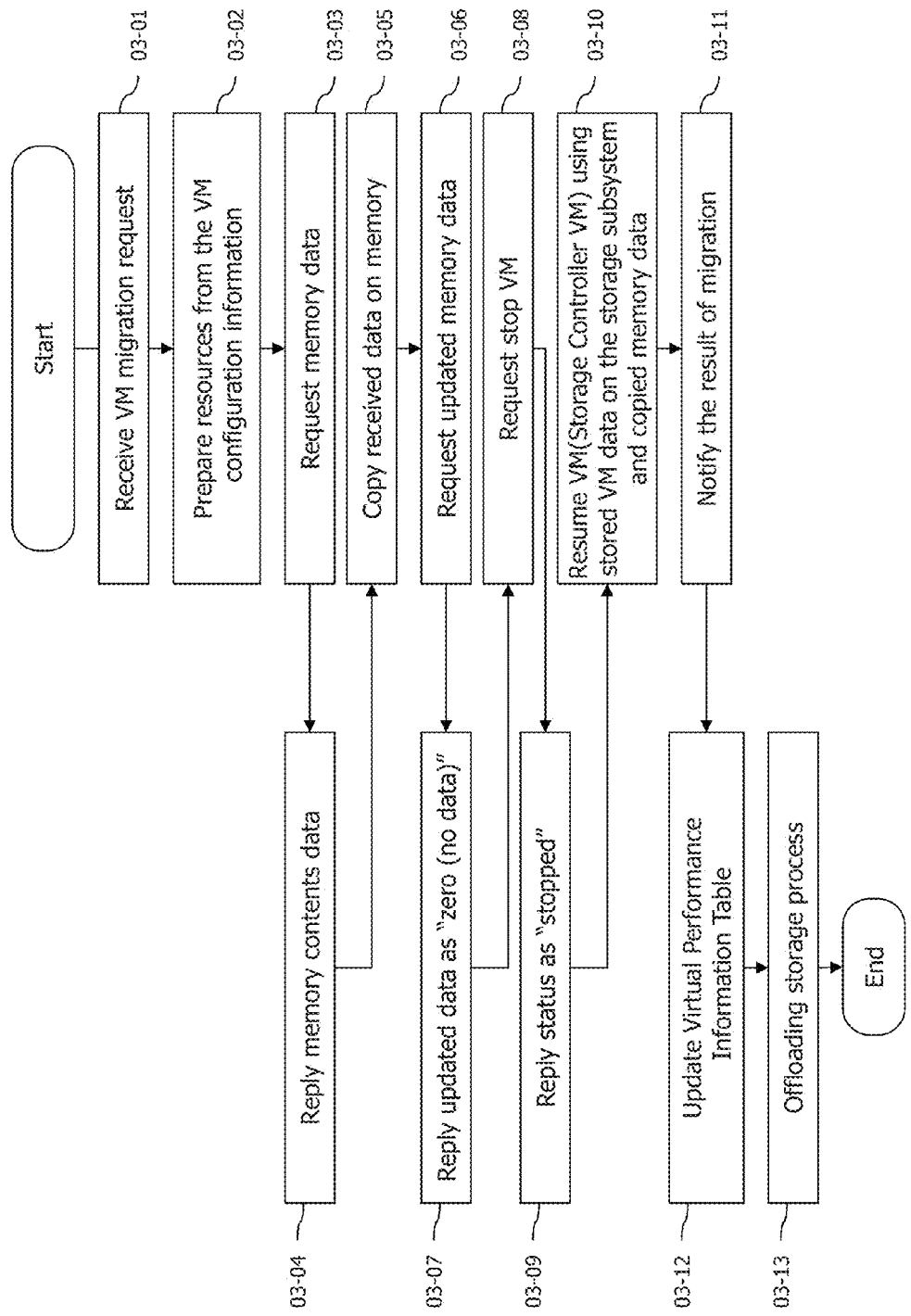
FIG. 19 is an example of a flow diagram illustrating a process flow of the storage process offload control as executed by the storage management server, and of the hypervisor for virtual machine as executed by the host, for VM migration from storage controller to host, according to the first embodiment.

FIG. 19 is an example of a flow diagram illustrating a process flow of the storage process offload control 402-03 as executed by the storage management server 400, and of the hypervisor for virtual machine 302-02 as executed by the host 300b, for VM migration from storage controller to host, according to the first embodiment.

In step 03-01, the hypervisor for virtual machine 302-02 has received a VM (VM_E (P2)) migration request from virtual machine management server 500 at step 02-07 in FIG. 18. The request includes the location of stored VM instance data.

In step 03-02, the hypervisor for virtual machine 302-02 confirms accessibility to the stored VM (VM_E (P2)) data in the volume (LU1) of the storage subsystem 100 and prepares resources based on the configuration data (e.g., virtual processor size, virtual memory size, and virtual network interface and file path to the virtual disk).

In step 03-03, the hypervisor for virtual machine 302-02 sends request for memory contents data transfer to the source host (in this embodiment, source host is storage management server 400 since the IP address assigned to the storage management server 400 is registered to the virtual server management server 500 in steps 01-01 and 01-02). In step 03-04, the storage process offload control 402-03 replies with memory contents data created at previous step 01-04 as actual memory data of VM. In step 03-05, the hypervisor for virtual machine 302-02 copies the received memory contents data on the allocated virtual memory.

In step 03-06, the hypervisor for virtual machine 302-02 sends request for memory data which is updated after the last memory data transfer to the source host. In step 03-07, the storage process offload control 402-03 replies with no updated memory data. In step 03-08, the hypervisor for virtual machine 302-02 sends request for stopping VM to the source host. In step 03-09, the storage process offload control 402-03 replies with VM status as stopped. On the other hand, the process on the storage controller 210 keeps running.

In step 03-10, the hypervisor for virtual machine 302-02 resumes VM (VM_E: storage controller VM) using stored VM data on the storage subsystem 200 and virtual machine data. In step 03-11, the hypervisor for virtual machine 302-02 notifies the result of migration to the virtual machine management server 500 and source host (storage management server 400). In step 03-12, the storage process offload control 402-03 updates "Offloading Status" field value from "Not offloaded" to "Offloaded" of related process record on the virtual performance information table 402-06. In step 03-13, the storage process offload control 402-03 starts offloading of storage processes (P3 related to VM_E) to storage controller VM on host 300b (Host_B) which is described in FIG. 20 below.

Figure 20:
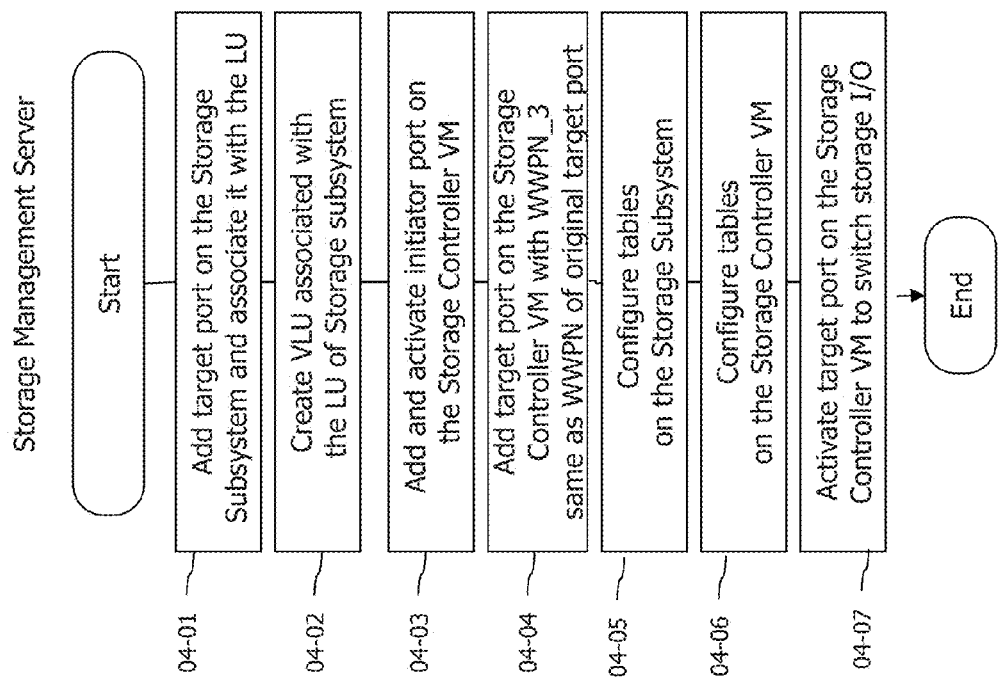
FIG. 20 is an example of a flow diagram illustrating a process flow of the storage process offload control as executed by the storage management server according to the first embodiment.

FIG. 20 is an example of a flow diagram illustrating a process flow of the storage process offload control 402-03 as executed by the storage management server 400 according to the first embodiment.

In step 04-01, the program adds a target port (WWPN_4) connecting to the SAN 200a on the storage subsystem 100, and associates the target port (WWPN_4) with LU3. Also the Storage Process Offload Control 402-03 activates the added target port (WWPN_4). This allows the storage subsystem 100 to send an FOISC message to the SAN 200a in order to get a new N_Port ID (N_Port ID_4) for the added target port (WWPN_4).

In step 04-02, the program searches LUs referred to in the offloading process info using the local volume management Table 112-06 on the storage subsystem 100, and then creates virtual LUs on the Storage Controller VM 302-04 and associates them with the corresponding LUs (LU3) of the storage subsystem 100 using the storage virtualization function. Examples of the storage virtualization function can be found in U.S. Pat. Nos. 7,003,634 and 7,228,380. In this embodiment 1, VLU3 is created and associated to LU3.

In step 04-03, the program adds and activates an initiator port (WWPN_C) connecting to the SAN 200a on the Storage Controller VM 302-04. In step 04-04, the program adds a target port for VLU3 on the Storage Controller VM 302-04, where the WWPN of the added target port is the same as the WWPN (WWPN_3) of the offloading process.

In step 04-05, the program configures the logical volume management table 112-06 to associate the target volume (LU3) with the target port (WWPN_4) which was added in step 04-01. Also, the data processing management table 112-08 is configured as shown in FIG. 16b which means that it allows access to the volume (LU3) via the initiator port (WWPN_C) which was added in step 04-03.

In step 04-06, the program configures the virtual volume management table 302-04-04 and the data processing management table 402-04-05 on the Storage Controller VM 302-04. In this embodiment 1, the virtual volume management table 302-04-04 is configured as shown in FIG. 6 in order to associate the created target port (WWPN_3 (v)) and the VLU3, and also associate the VLU3 of the Storage Controller VM 302-04 and the LU3 (target WWPN: WWPN_4, LUN: 0) of the storage subsystem 100. Also, the data processing management table 402-04-05 is configured as shown in FIG. 16b using the offloading process info and write policy which is predefined by system administrator.

FIG. 16b shows the second status of the offloading process after the steps of FIG. 17, FIG. 18, FIG. 19, and step 04-06 of FIG. 20. The Storage Controller VM 302-04 is running on the Host_B 300b and prepares the data processing management table 302-04-05 and ports for connection to the storage subsystem 100. Host_B 300b has VLU3 storing the difference data with respect to LU3. A path is established between VLU3 and LU3 via WWPN_C, N_Port ID_C in the Storage Controller VM 302-04 of Host B 300b, through SAN_A 200a, via N_Port ID_4, WWPN_4 of the storage subsystem 100. The data processing management table 302-04-05 in Host_B 300b shows write through for target WWPN_3 and initiator WWPN_A with compression as processing flag. The data processing management table 112-08 in the storage subsystem 100 shows target WWPN_4 and initiator WWPN_C.

In step 04-07, the program activates the target port (WWPN_3(v)) which was added in step 04-04. This allows the Storage Controller VM 302-04 to log into the SAN 200a in order to get a new N_Port ID for the target port (WWPN_3 (v)). As a result, WWPN_3 is registered into the SNS database of the SAN 200a. Then, the SAN 200a sends a RSCN to the host computer 300a. The host computer 300a sends a LOGOUT to logout after I/O completion (according to a Fibre Channel scheme to release N_Port ID_3 of the storage subsystem 100). Next, the host computer 300a gets the current information of the SNS database, and the SNS database of SAN 200a provides the new N_Port ID for the WWPN_3 on the Storage Controller VM 302-04 (WWPN_3(v), N_Port ID_5). This mechanism allows the host computer 300a to switch I/O from the storage subsystem 100 to the Storage Controller VM 302-04. The method of switching I/O is not limited to that described in this step 04-7. Examples of the Switching I/O methods can be found in U.S. Pat. No. 7,849, 265 and US2010/0070722.

FIG. 16c shows the third status of the offloading process after step 04-7 of FIG. 20. A path is established between VLU3 and Host_A 300a via WWPN_3(v), N_Port ID_5 in the Storage Controller VM 302-04 of Host B 300b, through SAN_A 200a, via WWPN_A, N_Port ID_A of Host_A 300a.

As shown above, the workload of the storage subsystem is offloaded to the host. By repeating the process in the above flow diagram, the workloads of the storage subsystem can be offloaded to multiple hosts.

Embodiment 2

Re-Allocate Offloaded Storage Process to an Original Storage Controller

The second embodiment discloses how to re-allocate offloaded storage process to an original storage controller while volume is used. The system configuration is supposed to be same as the end state of the first embodiment described above (FIG. 16c). It is further supposed that the system optimization program 502-04 regularly performs the system optimization process flow described in FIG. 18 and the program requests hosts to migrate offloaded storage controller VM (VM_E) from host 300b to Host_C (the storage controller 110).

Figure 21:
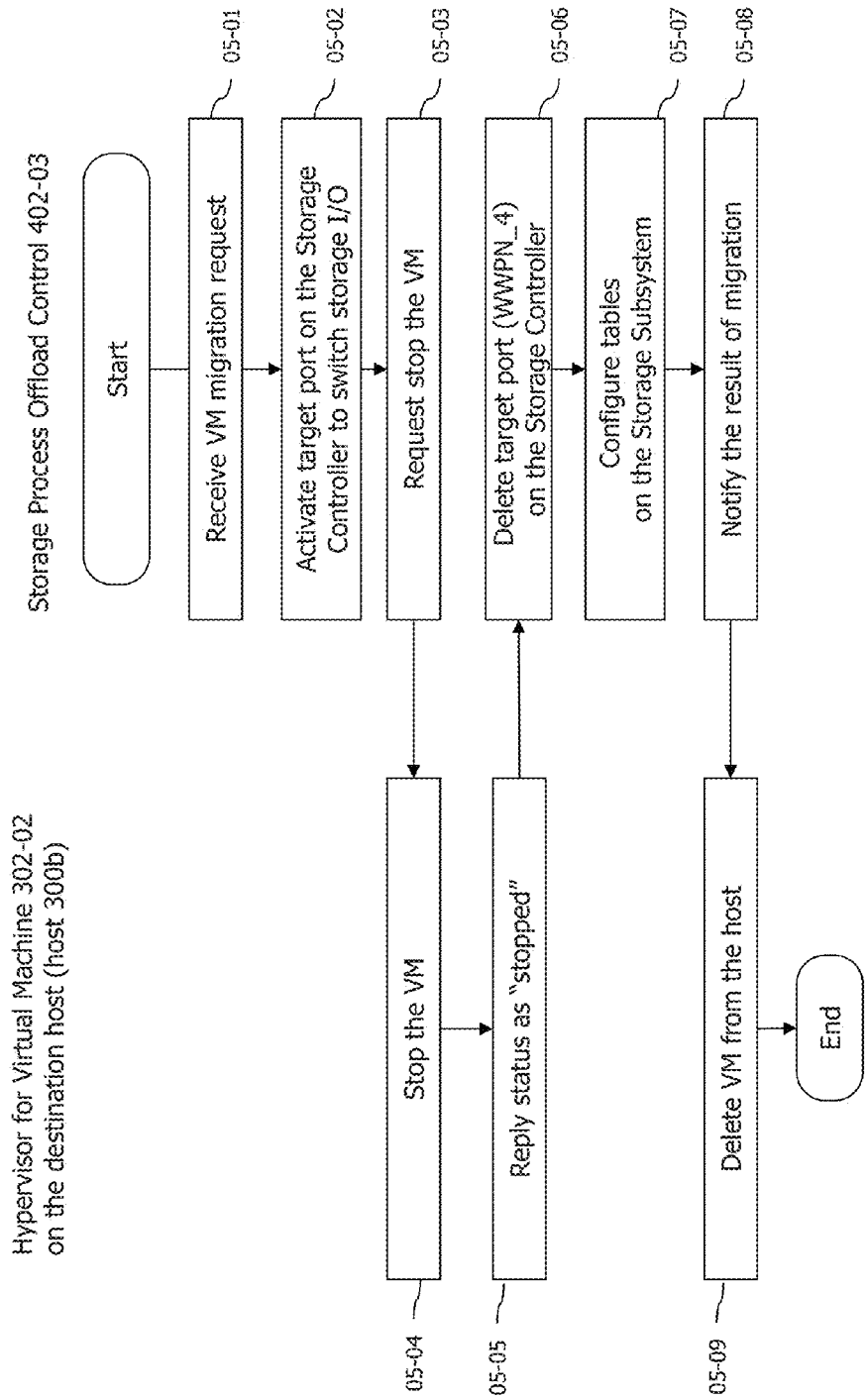
FIG. 21 is an example of a flow diagram illustrating a process flow of the storage process offload control as executed by the storage management server, and of the hypervisor for virtual machine as executed by the host, for VM migration from host to storage controller, according to the second embodiment.

FIG. 21 is an example of a flow diagram illustrating a process flow of the storage process offload control 402-03 as executed by the storage management server 400, and of the hypervisor for virtual machine 302-02 as executed by the host 300b, for VM migration from host to storage controller, according to the second embodiment.

In step 05-01, the storage process offload control 402-03 has received a VM (VM_E (P2)) migration request from virtual machine management server 500 at step 02-07 in FIG. 18. In step 05-02, the storage process offload control 402-03 activates the target port (WWPN_3). This allows the Storage Controller 302-04 to log into the SAN 200a in order to get a new N_Port ID for the target port (WWPN_3). As a result, WWPN_3 is registered into the SNS database of the SAN 200a. Then, the SAN 200a sends a RSCN to the host computer 300a. The host computer 300a sends a LOGOUT to logout after I/O completion (according to a Fibre Channel scheme to release N_Port ID_5 of the storage controller VM 302-04). Next, the host computer 300a gets the current information of the SNS database, and the SNS database of SAN 200a provides the new N_Port ID for the WWPN_3 on the Storage Controller 210 (WWPN_3, N_Port ID_6). This mechanism allows the host computer 300a to switch I/O from the storage controller VM 302-04 on the host 300b to the storage subsystem 100. The method of switching I/O is not limited to that described in this step 05-02.

In step 05-03, the storage process offload control 402-03 sends a request for stopping VM to the source host (host 300b). In step 05-04, the hypervisor for virtual machine 302-02 stops the storage controller VM (VM_E). In step 05-05, the hypervisor for virtual machine 302-02 replies with the status of VM as "stopped" to the storage process offload control 402-03. In step 05-06, the storage process offload control 402-03 sends a LOGOUT of the target port for offloading (WWPN_4) to logout and deletes the target port (WWPN_4).

In step 05-07, the storage process offload control 402-03 configures the logical volume management table 112-06 and data processing management table 112-08 on the storage controller 210. In this embodiment 2, the storage process offload control 402-03 deletes a record related to the deleted target port (WWPN_4, 4th record of FIG. 3). Also, the storage process offload control 402-03 deletes a record related to the deleted target port (WWPN_4, 4th record of FIG. 4) of the data processing management table 112-08. In addition, the storage process offload control 402-03 configures the virtual performance information table 402-06 of the storage management server 400. In this embodiment 2, the storage process offload control 402-03 deletes a record related to the deleted record of the data processing management table 112-08 (4th record of FIG. 10). Also, the storage process offload control 402-03 changes the value of "Offloading Status" field related to the migrated VM_E (P3) of the data processing management table 112-08 from "Offloaded" to "Not offloaded."

In step 05-08, the storage process offload control 402-03 notifies the result of migration to the hypervisor for virtual machine 302-02 of host 300b. In step 05-09, the hypervisor for virtual machine 302-02 deletes migrated VM data from the host 300b.

Of course, the system configuration illustrated in FIG. 1 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for offloading storage workload. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage management computer for managing offloading of storage workload between a storage controller of a storage system and one or more host computers, the storage management computer comprising:
    a processor;
    a controller operable to request a virtual machine management computer to register the storage controller as a host computer, and to send, to the virtual machine management computer, storage processes information of storage processes in the storage system which can be offloaded as virtual machines in order for the virtual machine management computer to register the storage processes as virtual machines;
    wherein the controller is operable to request the virtual machine management computer to add the storage controller registered as a host computer into an optimization group of host computers, and to register one or more allocation rules for allocating virtual machines among the host computers in the optimization group, including an allocation rule that prohibits virtual machines except the storage processes that are registered as virtual machines to be migrated to the storage controller registered as a host computer;
    wherein migration of virtual machines between the host computers in the optimization group is performed according to the one or more allocation rules; and
    wherein, upon receiving a virtual machine migration request from a destination host computer to migrate one or more storage processes registered as virtual machines from the storage controller registered as a host computer to the destination host computer, the controller is operable to migrate the one or more storage processes registered as virtual machines, from the storage controller registered as a host computer to the destination host computer, via an offload target port on the storage controller.

2. The storage management computer according to claim 1, wherein the controller is operable to create storage controller virtual machine instance data from a template of storage controller virtual machine for each of the storage processes which can be offloaded as virtual machines; and
    wherein the storage processes information comprises the created data.

3. The storage management computer according to claim 1, wherein the controller is operable:
    if the storage management computer is part of the storage system, to allocate an IP address of the storage system as an IP address of the storage controller, which is registered as a host computer, to communicate with the virtual machine management computer; and
    if the storage management computer is not part of the storage system, to allocate an IP address of the storage management computer as an IP address of the storage controller, which is registered as a host computer, to communicate with the virtual machine management computer.

4. The storage management computer according to claim 1, wherein the controller is operable to create memory contents data from a template of storage controller virtual machine for each of the storage processes which can be offloaded as virtual machines, and to send the created memory contents data to the destination host computer, in order for the destination host computer to resume operation of the migrated one or more storage processes registered as virtual machines, after the migration, using the memory contents data.

5. The storage management computer according to claim 1, wherein, upon receiving another virtual machine migration request from the destination host computer to migrate the one or more storage processes registered as virtual machines from the destination host computer back to the storage controller registered as a host computer, the controller is operable to activate a target port on the storage controller to switch storage I/O (Input/Output) to the target port, send a request to the destination host computer to stop the one or more storage processes registered as virtual machines, and delete an offload target port on the storage controller used for offloading the one or more storage processes registered as virtual machines to the destination host computer.

6. A method for managing offloading of storage workload between a storage controller of a storage system and one or more host computers, by a storage management computer including a processor and a memory, the method comprising:
    requesting a virtual machine management computer to register the storage controller as a host computer;
    sending, to the virtual machine management computer, storage processes information of storage processes in the storage system which can be offloaded as virtual machines in order for the virtual machine management computer to register the storage processes as virtual machines;
    requesting the virtual machine management computer to add the storage controller registered as a host computer into an optimization group of host computers;
    registering one or more allocation rules for allocating virtual machines among the host computers in the optimization group, including an allocation rule that prohibits virtual machines except the storage processes that are registered as virtual machines to be migrated to the storage controller registered as a host computer;
    wherein migration of virtual machines between the host computers in the optimization group is performed according to the one or more allocation rules; and
    upon receiving a virtual machine migration request from a destination host computer to migrate one or more storage processes registered as virtual machines from the storage controller registered as a host computer to the destination host computer, migrating the one or more storage processes registered as virtual machines, from the storage controller registered as a host computer to the destination host computer, via an offload target port on the storage controller.

7. The method according to claim 6, further comprising:
    creating storage controller virtual machine instance data from a template of storage controller virtual machine for each of the storage processes which can be offloaded as virtual machines;
    wherein the storage processes information comprises the created data.

8. The method according to claim 6, further comprising:
if the storage management computer is part of the storage system, allocating an IP address of the storage system as an IP address of the storage controller, which is registered as a host computer, to communicate with the virtual machine management computer; and
if the storage management computer is not part of the storage system, allocating an IP address of the storage management computer as an IP address of the storage controller, which is registered as a host computer, to communicate with the virtual machine management computer.

9. The method according to claim 7, further comprising:
creating memory contents data from a template of storage controller virtual machine for each of the storage processes which can be offloaded as virtual machines; and
sending the created memory contents data to the destination host computer, in order for the destination host computer to resume operation of the migrated one or more storage processes registered as virtual machines, after the migration, using the memory contents data.

10. The method according to claim 7, further comprising:
upon receiving another virtual machine migration request from the destination host computer to migrate the one or more storage processes registered as virtual machines from the destination host computer back to the storage controller registered as a host computer, activating a target port on the storage controller to switch storage I/O (Input/Output) to the target port, sending a request to the destination host computer to stop the one or more storage processes registered as virtual machines; and deleting an offload target port on the storage controller used for offloading the one or more storage processes registered as virtual machines to the destination host computer.

11. A non-transitory computer-readable storage medium storing a plurality of instructions for controlling a data processor of a storage management computer to manage offloading of storage workload between a storage controller of a storage system and one or more host computers, the plurality of instructions comprising:
instructions that cause the data processor to request a virtual machine management computer to register the storage controller as a host computer;
instructions that cause the data processor to send, to the virtual machine management computer, storage processes information of storage processes in the storage system which can be offloaded as virtual machines in order for the virtual machine management computer to register the storage processes as virtual machines;
instructions that cause the data process to request the virtual machine management computer to add the storage controller registered as a host computer into an optimization group of host computers;
instructions that cause the data process to register one or more allocation rules for allocating virtual machines among the host computers in the optimization group, including an allocation rule that prohibits virtual machines except the storage processes that are registered as virtual machines to be migrated to the storage controller registered as a host computer;
wherein migration of virtual machines between the host computers in the optimization group is performed according to the one or more allocation rules; and
instructions that cause the data processor, upon receiving a virtual machine migration request from a destination host computer to migrate one or more storage processes registered as virtual machines from the storage controller registered as a host computer to the destination host computer, to migrate the one or more storage processes registered as virtual machines, from the storage controller registered as a host computer to the destination host computer, via an offload target port on the storage controller.

12. The non-transitory computer-readable storage medium according to claim 11, wherein the plurality of instructions further comprise:
instructions that cause the data processor to create storage controller virtual machine instance data from a template of storage controller virtual machine for each of the storage processes which can be offloaded as virtual machines; and
wherein the storage processes information comprises the created data.

13. The non-transitory computer-readable storage medium according to claim 11, wherein the plurality of instructions further comprise:
instructions that cause the data processor to create memory contents data from a template of storage controller virtual machine for each of the storage processes which can be offloaded as virtual machines; and
instructions that cause the data processor to send the created memory contents data to the destination host computer, in order for the destination host computer to resume operation of the migrated one or more storage processes registered as virtual machines, after the migration, using the memory contents data.

14. The non-transitory computer-readable storage medium according to claim 11, wherein the plurality of instructions further comprise:
instructions that cause the data processor, upon receiving another virtual machine migration request from the destination host computer to migrate the one or more storage processes registered as virtual machines from the destination host computer back to the storage controller registered as a host computer, to activate a target port on the storage controller to switch storage I/O (Input/Output) to the target port, to send a request to the destination host computer to stop the one or more storage processes registered as virtual machines, and to delete an offload target port on the storage controller used for offloading the one or more storage processes registered as virtual machines to the destination host computer.

* * * * *